July 17, 1956
R. F. WILSON
2,754,992
FUEL CELL
Filed Dec. 26, 1951
2 Sheets—Sheet 1
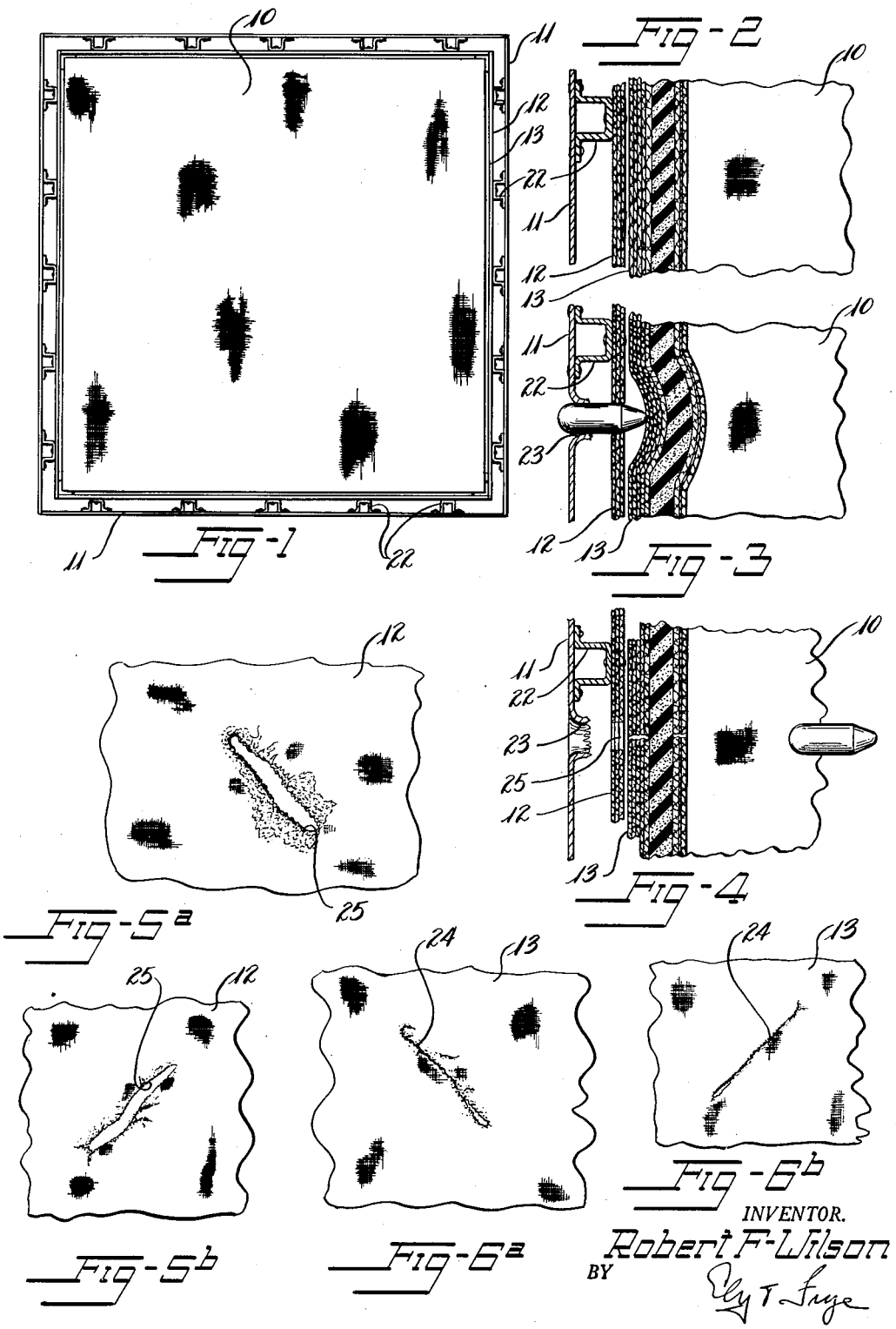
INVENTOR.
Robert F. Wilson
BY
Ely T. Frye
Attys July 17, 1956 R. F. WILSON 2,754,992
FUEL CELL Filed Dec. 26, 1951 2 Sheets-Sheet 2

INVENTOR.
Robert F. Wilson
BY
Ely & Frye
Attys-

United States Patent Office 2,754,992
Patented July 17, 1956

2,754,992

FUEL CELL

Robert F. Wilson, San Gabriel, Calif., assignor to The Firestone Tire & Rubber Company, Akron, Ohio, a corporation of Ohio Application December 26, 1951, Serial No. 263,362

1 Claim. (Cl. 220—63)

This invention relates to fuel cells of the self-sealing type and more particularly to improved means of supporting such cells.

Conventional fuel cell construction of the self-sealing type comprises a multi-ply cell which is adapted to fit snugly within a cavity in the wings or fuselage of an airplane. The cavity is usually lined with backing material which is intended to give support to the walls of the cell and which is also intended to prevent the surrounding aluminum sheet from "petaling" into the fuel cell wall when a bullet pierces the cell, "petaling" being the term applied to the formation of jagged flaps of sheet aluminum, resembling the petals of a flower, which are curled inwardly when a bullet penetrates the aluminum wall. These metallic flaps may be forced into the wall of the fuel cell where they will hold the punctured fuel cell open and prevent it from sealing after a bullet has passed through. The backing material which is used to prevent petaling of the aluminum is usually a flexible board of laminated plies of fabric which are impregnated with a suitable binding material. The backing material tends to have a rather large hole blown into it by the bullet and fragments of skin or structure, and the edges of the hole are usually shattered and torn by the rebound of the fuel cell as augmented by the surging of the fuel after the bullet has passed. The result is that the backing, by reason of the large hole, does not fully support the punctured fuel cell and maximum safety is not achieved.

The present invention meets this problem by introducing a floating panel between the backing material and the fuel cell. The panel is not fastened either to the backing material or to the fuel cell and is cut undersize by an amount which permits it to shift laterally in all directions between the cell and the anchored backing. When a bullet passes through a fuel cell, supported in this manner, the cell and the floating panel will deflect under the impact of the bullet in a manner which allows the bullet to knife through the panel forming a narrow slit rather than a large jagged hole. When the panel returns to its original position, the edges of the slit close together, and, in addition, the panel may at times shift laterally so that the slit is out of registry both with the bullet hole in the aluminum and lining material and also with the puncture in the cell wall itself. The floating panel is thus able to give the maximum possible mechanical support to the punctured cell wall.

The general object of the invention, therefore, is to overcome the deficiencies of the prior practice and provide a more effective support for fuel cells of the self-sealing type.

A more specific object is to provide a movable panel member between a fuel cell and its suporting structure to provide maximum support to the cell adjacent its punctured area enabling the cell to perform its self-sealing function more effectively.

Other objects are to provide a method of supporting a fuel cell which can be quickly and cheaply manufactured, and which is easy to install and maintain.

These and other objects and advantages of the invention will be more fully understood from the following description of a preferred form of the invention, reference being had to the accompanying drawings in which:

Figure 1 is a view of a fuel cell, partly in section, with supporting structure embodying the invention;

Figure 2 is a fragmentary view of the fuel cell of Figure 1, on a somewhat larger scale than Figure 1, showing the fuel cell and its supporting structure just prior to the impact of a bullet;

Figure 3 is a view corresponding to Figure 2 showing the deflection of the fuel cell wall and its supporting panel under the impact of a bullet;

Figure 4 is a view corresponding to Figures 2 and 3 showing the rebound of the fuel cell wall after the bullet has completely pierced it;

Figure 5a shows the hole torn in the outer side of the fixed supporting liner by a bullet; and Figure 5b shows the hole torn in the inner side;

Figure 6a shows the hole torn in the outer side of the floating panel by a bullet; and Figure 6b shows in plan view the hole torn in the inner side;

A preferred form of the invention as shown in Figure 1 comprises a fuel cell indicated generally at 10 which is positioned within a cavity in the wing structure 11 of an airplane and supported therein by a fixed backing 12 comprising panels of suitable material secured to the wing structure and supported also by a floating liner comprising a plurality of loose panels 13 positioned between the cell and the backing 12.

Figure 8:
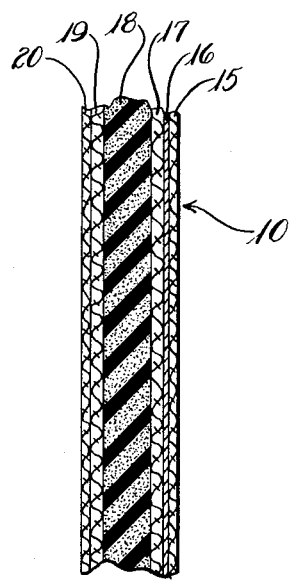
Figure 8 is a fragmentary sectional view on an enlarged scale showing the laminated construction of the fuel cell wall.

The cell 10 is of a conventional laminated construction which will be described only briefly for it, per se, forms no part of the invention. As shown particularly in Figure 8, the cell is built up from a number of layers of material, each having a specialized function which contributes to the performance of the cell as a whole. In the present example, the cell wall comprises an inner liner of rubberized fabric 15, a thin, flexible, continuous film 16 of nylon, a fabric ply 17 preferably of nylon cord, a relatively thick sealant layer 18 of unvulcanized rubber or gum, a ply 19 of nylon cord, and lastly, a fabric coating 20 of rubberized nylon twill on the outer surface.

The functions of these various laminations which make up the cell wall are well understood. The nylon film 16 acts as a barrier to prevent the gasoline from penetrating to the inner layers of the cell wall and causing them to swell and become heavy with fuel; the sealant layer 18 is of such nature that contact with the gasoline when a bullet tears a hole in the wall causes it to swell and close up the bullet hole; and the various fabric plies give the required strength to the cell.

It will be understood, however, that while the expanded sealant will seal the torn bullet hole, the sealant has little mechanical strength, and it is desirable to support the fuel cell wall at the bullet hole. This mechanical support is provided by the panels 13, which are interposed between the fixed backing 12 and the fuel cell. The panels preferably are of tough, somewhat flexible material in order to carry out their desired functions and are preferably formed of a plurality of nylon plies impregnated with a suitable binding agent and heated and pressed together to form a laminated structure. Such material has been used in the past for the anchored backing 12 and has been found to be equally suitable for use as a floating liner. If desired, cotton fabric or glass fabric plies may be laminated together and used for the liner. Any of these materials provide the necessary strength and toughness combined with light weight.

Each panel 13 is in the order of 3/32 inch in thickness and has approximately the same area as the adjacent cell wall which it is intended to support. It is, however, cut somewhat smaller in at least one dimension so that it can have limited movement relative to the fuel cell wall. Thus, the floating panels 13 may be about ½ to 1 inch shorter in length and width than the corresponding fixed liner panel so as to be capable of a corresponding amount of lateral shifting.

It will be noted that the backing 12 is firmly secured to the inner walls of the wing structure 11. If the wing has reinforcing hat sections such as indicated at 22 the panels comprising the backing will be secured to the flat crowns of the hat section as by rivets or any other suitable means; otherwise the backing will be fastened directly to the walls of the wing. As mentioned above, the backing is of tough, strong material and is primarily intended to back up the aluminum to prevent petaling when a bullet strikes.

The function of the floating liner 13 can be best understood by considering what happens when a bullet pierces the fuel cell. As illustrated in Figure 3, the fixed backing will remain substantially in place, but the floating liner and the laminated wall of the cell will deflect inwardly a considerable amount under the impact of the bullet. The floating liner thus is curved concavely as the bullet passes through, and apparently this curvature enables the bullet to slice through without blasting an unduly large hole in the liner. Whatever the cause, the bullet hole in the floating liner takes the form of a slit which virtually closes up after the bullet has passed through. This condition is illustrated in Figures 6a and 6b. Lastly, the deflected cell wall rebounds to its normal position shown in Figure 4 with much of the shock of rebound absorbed by the floating liner. Without the floating liner, the cell wall in rebounding tends to enlarge the hole torn in the backing 12. The floating liner thus acts as a buffer and prevents the enlargement of the hole.

Figure 7:
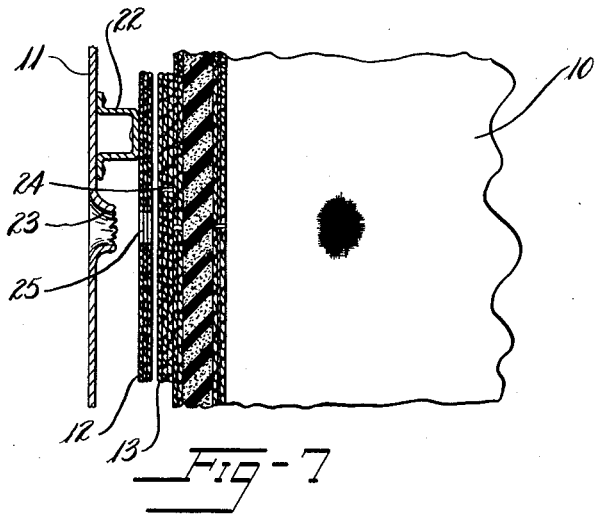
Figure 7 is a sectional view of the fuel cell and supporting structure taken through the path of the bullet and showing the floating panel out of registry with the fixed supporting liner and fuel cell wall.

Examination of the fuel cell and supporting structure will reveal the damage done by the bullet and show the manner in which the floating liner provides the desired results. A hole, indicated at 25, of a size approximately that of the bullet tends to be blown in the fixed backing material, and the surface facing the aluminum sheet is torn up by the jagged flaps of aluminum, see Figure 5a, while the structure surrounding the hole on the inner side of the fixed backing, i. e. on the side adjacent the floating panel, remains more intact, see Figure 5b. It should be noted that in the absence of the floating panels 13 the rebound of the cell wall would enlarge the hole 25 in the fixed backing to produce an opening considerably larger than that illustrated in Figures 5a and 5b. In contrast to the fixed backing, the floating liner 13 is merely slit, as indicated at 24, by the bullet, and the slit is virtually closed after the bullet has passed, see Figures 6a and 6b which show the outer and inner sides of the panel, respectively. It will be noted that the floating panel will give substantially full support to the puncture 25 in the cell wall even in the area of slit 24, and that if there is a slight lateral shifting of the floating panel, as shown in Figure 7, a sound panel wall portion will be interposed between the fuel cell wall and puncture 25.

It is believed that the size of the hole torn by the bullet in the floating liner is minimized by the freedom of the liner to deflect. It is also believed that if substantial amounts of a plasticizer are incorporated in the liner that the lubrication furnished thereby will enable the bullet to pass through with a minimum tearing of the liner board. In some cases lubricant may be furnished to the outer surfaces of the liner not only to lubricate the passage of the bullet, but also to minimize the sliding friction between the floating liner and the adjacent walls of the backing and fuel cell, enabling the floating liner to move out of registry with the bullet holes. If lubricant is not provided, it is desired that the coefficient of friction of the material making up the floating panel be inherently small to minimize sliding friction.

While a preferred form of invention has been described and illustrated, it will be apparent that changes and modifications will occur to those skilled in the art without departing from the spirit and scope of the invention, the essential features of which are summarized in the appended claim.

What is claimed is:

A containing structure for a fuel cell comprising a substantially rigid housing enclosing said cell, a fixed lining of shatterproof material secured to the inner walls of said housing and a free, floating panel of self-supporting, board-like, shatterproof material interposed between a wall of said lining and the adjacent wall of said fuel cell, said panel being substantially shorter in at least one lateral direction than said cell wall whereby said panel is free to deflect inwardly and is free to shift bodily with respect to said cell wall in said lateral direction when said panel and fuel cell are pierced by a projectile.

References Cited in the file of this patent

UNITED STATES PATENTS

| | | |
|---|---|---|
| 2,354,701 | Pescara | Aug. 1, 1944 |
| 2,406,679 | Gray et al. | Aug. 27, 1946 |
| 2,429,688 | Hoover | Oct. 28, 1947 |
| 2,558,807 | Bailey | July 3, 1951 |